United States Patent [19]
Wright

[11] Patent Number: 5,762,341
[45] Date of Patent: Jun. 9, 1998

[54] O-RING INSERT

[75] Inventor: John Bennison Wright, Alliston, Canada

[73] Assignee: Zygo Mould Limited, Etobicoke, Canada

[21] Appl. No.: 782,914

[22] Filed: Jan. 13, 1997

[51] Int. Cl.$^6$ .................................................. F16J 15/10
[52] U.S. Cl. .............................. 277/1; 277/11; 277/171; 277/187; 277/189
[58] Field of Search ............................. 277/1, 9, 11, 170, 277/171, 172, 176, 177, 187, 189, 189.5

[56] References Cited

U.S. PATENT DOCUMENTS

| | | | |
|---|---|---|---|
| 672,598 | 4/1901 | Drew | 277/187 |
| 3,007,600 | 11/1961 | Horner | 277/187 |
| 3,249,372 | 5/1966 | Pollack | 277/169 |
| 3,262,722 | 7/1966 | Gastineau et al. | |
| 3,300,225 | 1/1967 | Shepler | 277/187 |
| 3,425,716 | 2/1969 | Blau | 277/189 |
| 3,442,515 | 5/1969 | Murauskas | 277/165 |
| 3,664,674 | 5/1972 | Yehl | 277/187 |
| 3,693,986 | 9/1972 | Lambie | 277/207 R |
| 3,698,728 | 10/1972 | Walker | 277/165 |
| 3,854,735 | 12/1974 | Maurer et al. | 277/189 |
| 4,034,993 | 7/1977 | Okada et al. | 277/188 A |
| 4,798,481 | 1/1989 | Frank | 277/187 |
| 4,843,187 | 6/1989 | Johnson | 277/189 |

FOREIGN PATENT DOCUMENTS

| 1003674 | 3/1957 | Germany | 277/189 |
|---|---|---|---|

*Primary Examiner*—William A. Cuchlinski, Jr.
*Assistant Examiner*—John L. Beres
*Attorney, Agent, or Firm*—Spencer & Frank

[57] ABSTRACT

An insert for providing a seal at the junction of axially aligned bores extending through two adjacent segments of material. The insert is of a rigid material, has an inner diameter equal to the diameter of the bore, and comprises a retaining portion with a frusto-conical outer surface and a stem portion with a cylindrical outer surface. The insert is retained in a co-axial recess which extends inwardly from the face of one of the segments of material. In this manner, the retaining portion of the insert and the walls of the recess define a groove for retaining an O-ring. Also described is a method of providing a seal at the junction of axially aligned bores extending through two segments of material. The method includes the steps of boring a recess in one of the bores, introducing the insert into the recess, retainably inserting an O-ring into an annular groove defined between the insert and the recess, and bringing the segments together.

10 Claims, 3 Drawing Sheets

O-RING INSERT

FIELD OF THE INVENTION

This invention relates to sealing methods and devices. More specifically, the invention relates to a device and method of providing a seal at the junction of axially aligned bores extending across the interface between two segments of solid material.

BACKGROUND OF THE INVENTION

In a wide range of hydraulic, pneumatic, mechanical and other devices such as pumps, engines, transmissions, turbines, chemical reaction installations, etc., one or more fluids, typically under pressure, have to be delivered through bores extending through a plurality of blocks or segments. Examples of such fluids include air and other gases; water, organic liquids and other aqueous and non-aqueous liquid mediums; melts; molten plastics and plastic material precursors; lubricants; etc.

Although a number of various methods and materials may be used for providing a seal at the junction of fluid conduits or bores extending through two adjacent block or segments, resilient rings having a substantially circular cross-section (O-rings) are most often used in applications where such blocks or segments have to be taken apart and assembled back together on a regular basis.

An O-ring is typically inserted into an annular groove provided in the mating face of one of the blocks or segments, the groove being co-axial with the bore opening. The other mating face is generally flat. The depth of the annular groove is smaller than the depth of the O-ring so that the mating faces, when brought together, deform the ring and provide for a tight seal. In use, the pressurized fluid additionally deforms the ring and provides for an even better seal.

In order for an O-ring to perform its function properly, the shapes of the annular groove and opposing mating face should be such as to limit the displacement of the O-ring subjected to deformation forces. The dimensions of the groove, therefore, are critical and any manufacturing imprecision, as well as any degree of corrosion or deterioration of the surfaces during operation of the device could lead to expulsion of the O-ring from its groove and loss of a proper seal.

Various devices known in the art address the problem of limiting or directing the displacement of an O-ring. Thus, for example, U.S. Pat. No. 3,698,728, discloses a back-up ring designed to limit the displacement and reduce the abrasion of a resilient O-ring in the case of unevenly manufactured or corroded surfaces. Gastineau et al., in U.S. Pat. No. 3,262,722, employ a similar approach to hollow metallic O-rings. U.S. Pat. 4,034,993 to Okada et al. discloses two back-up rings placed inside the groove together with a resilient O-ring to direct its displacement and to ensure a proper seal even in the case the mating faces have not been brought completely together. There are a number of limitations to these devices, particularly when used in the injection moulding industry.

Moulds used in the injection moulding industry are complex tools which, in addition to shaping a moulded product, have to provide for delivery of the material, circulation of heating and/or cooling fluids and other functions. Bores typically extend from the body or frame of the mould, installed in the moulding machine, through one or more detachable modules or segments. Each interface between the segments, therefore, typically comprises a plurality of junctions or interfaces between bores which have to be sealed in order to avoid leakage. Loss of a proper seal will generally have an adverse effect on the operation and useful life of the mould and the complete moulding machine. Additionally, if the fluids are aggressive, flammable or toxic, and particularly if different fluids are being delivered at different temperatures and/or pressures, leakage may represent a serious safety risk.

When the assembly of a modular mould is performed without removing the body or frame from the moulding machine, the mating faces are typically vertical or inclined under an angle. If the O-rings are inserted into annular grooves having substantially rectangular cross-section (see FIG. 1), there is a possibility of one or more of them falling out of the respective annular grooves before the mating faces are brought completely together. This would lead to an improper seal and leakage of the fluid, which could go unnoticed until the operation of the mould is affected. Depending upon the pressure, temperature and aggressiveness of the fluid, the area of the mating face between the bore and the annular groove will be corroded or otherwise destroyed and the mould will have to be discarded long before the expiry of its nominal useful life.

Designed to provide for a better seal and reduced wear of O-rings, the back-up rings of the U.S. Pat. Nos. 3,698,728, 3,262,722 and 4,034,993 are not capable of retaining an O-ring inside the annular groove while the respective devices are in a disassembled state. Moreover, if the end of a bore is corroded or otherwise destroyed, a mere replacement of the O-ring, with or without back-up devices, would not offer a complete solution. As rough surfaces, variations in diameter and spacing between the mating faces change the dynamics of the fluid being delivered through the bore, the resultant turbulent flow may "wash away" the material at an increasing rate and lead to a significantly reduced useful life of the device.

In U.S. Pat. No. 3,425,716, to Blau discloses a seal specifically for use with a glass tube. The seal includes a bushing with the inner surface thereof forming the end portion of a conduit. The bushing is also provided with a lip which partially encloses a resilient O-ring. However, this device is designed to limit the inwardly oriented displacement of an O-ring (the conduit is typically under vacuum) and the role of the lip is to protect the O-ring from contact with an aggressive fluid.

In order to avoid the possibility of an O-ring falling out of the annular groove, a suggestion has been made in the industry that the rectangular cross-section grooves be replaced with grooves having a dovetail cross-section (see FIG. 2). This approach, however, requires special tooling and multiple milling operations, which add considerably to the costs of manufacturing the mould.

There remains in the industry a need for a simple and inexpensive method of retaining an O-ring in the position during the disassembly and assembly of devices with fluid conduits extending through a plurality of blocks or segments where mating faces are oriented vertically or under an angle and, in particular, modular moulds used in the injection moulding industry. Also, there is a need for an efficient method of repairing segments with corroded or otherwise destroyed grooves and end portions of the conduits. These and other objectives are met by the O-ring insert and methods of the present invention.

SUMMARY OF THE INVENTION

In one aspect, the present invention relates to an insert for use in providing a seal at the junction of fluid conduits, or bores, extending through two segments of solid material having generally flat mating faces. In the invention, one of the mating faces has a first circular recess extending inwardly from the mating face and co-axial with the bore, this recess having a diameter greater than the diameter of the bore. The mating face also includes a second circular recess extending co-axially inward from the bottom of the first recess having a diameter greater than the diameter of the bore but smaller than the diameter of the first recess.

The insert, preferably manufactured of a substantially rigid material, comprises a shoulder or retaining portion and a stem portion. The shoulder or retaining portion preferably has a length substantially equal to or smaller than the depth of the first recess and preferably has a flat end face. The stem portion has a length sufficient to be retained in the second recess and preferably has an outer surface of a substantially cylindrical shape, the outer diameter of the stem portion being substantially equal to the diameter of the second recess so as to provide a friction fit.

In the preferred embodiment, the retaining portion has an outer surface of a substantially frusto-conical shape, and the end face diameter is greater than the inner diameter of a resilient ring of a substantially circular cross-section (i.e., O-ring) used to provide a seal when the two mating faces are brought together. The O-ring, which preferably has an outer diameter substantially equal to the diameter of the first recess, and a cross-sectional depth greater than the depth of the first recess, is retainably accommodated in an annular groove defined by the surfaces of the first recess and the outer surface of the retaining portion of the insert.

This arrangement has been found to securely retain the O-ring even when one of the mating faces is in a vertical orientation.

According to the preferred embodiment, the insert is retained in the second recess by the frictional forces between the surface of the second recess and the outer surface of the stem portion of the insert. Alternatively, the insert can be retained in the second recess by means of a threaded engagement, an adhesive, etc.

In a further aspect, the present invention comprises a method of providing a seal at the junction of fluid conduits, or bores, extending through two segments of solid material having generally flat mating faces. In this method, two preferably circular recesses are drilled, co-axially with the bore, in one of the mating faces. The first circular recess has a substantially rectangular cross-section and a diameter greater than the diameter of the bore. The second circular recess has a diameter greater than the diameter of the bore and smaller than the diameter of the first recess, and extends inwardly from the bottom of the first recess.

The method further comprises providing a substantially rigid tubular insert, and an O-ring with an outer diameter substantially equal to the diameter of the first recess and a cross-sectional depth preferably greater than the depth of the first recess.

The insert comprises a retaining portion and a stem portion. The retaining portion has the length substantially equal to or smaller than the depth of the first recess and a flat end face. The stem portion has the length substantially equal to or greater than the depth of the second recess and an outer surface of a substantially cylindrical shape, the diameter of the cylinder being substantially equal to the diameter of the second recess.

In the prefered embodiment, the insert has an inner diameter substantially equal to the diameter of the conduit. According to the prefered embodiment, the retaining portion has an outer surface of a substantially frusto-conical shape, with the diameter of its end face being greater than the inner diameter of the O-ring and the diameter adjacent the stem portion being substantially equal to the diameter of the second recess.

The method thereafter comprises inserting the stem portion into the second recess, retainably inserting the O-ring into the annular groove defined by the surfaces of the first recess and the outer surface of the retaining portion of the insert, and bringing the mating faces together.

In yet another aspect, the invention comprises a method of re-establishing a seal at the junction of fluid conduits, or bores, extending through two segments of solid material having generally flat mating faces, with one of the mating faces having been provided, co-axially with the bore, with an annular groove of a substantially rectangular cross-section for accommodating an O-ring (the original groove). The loss of the proper seal has been caused by the area of the mating face between the bore and the inner surface of the original annular groove having been destroyed over time due to a corrosive and/or abrasive action of the fluid being transported through the bore.

In accordance with this aspect of the invention, a preferably circular recess is bored in the mating face, co-axially with the bore. The circular recess has a substantially rectangular cross-section and a diameter equal to or greater than the inner diameter of the original annular groove and smaller than the outer diameter of the original annular groove. The method further comprises providing a substantially rigid tubular insert, and an O-ring having an outer diameter substantially equal to the outer diameter of the original annular groove, an inner diameter equal to or greater than the diameter of the recess and a cross-sectional diameter greater than the depth of the original annular groove.

The retaining portion of the insert has the length substantially equal to or smaller than the depth of the original annular groove and a flat end face. The stem portion of said insert has a length substantially equal to or greater than the depth of the recess and an outer surface of a substantially cylindrical shape, the diameter of the cylinder being substantially equal to the diameter of the recess.

The method according to this aspect of the invention thereafter comprises inserting the insert into the recess, securing the O-ring in a new annular groove, defined by the remaining surfaces of the original annular groove and the outer surface of the retaining portion of the insert, and bringing the mating faces together.

Other aspects and advantages of the present invention will become apparent from the detailed description of the preferred embodiments.

BRIEF DESCRIPTION OF THE DRAWINGS

For a better understanding of the present invention and to show more clearly how it may be carried into effect, reference will now be made by way of example to the accompanying drawings, in which.

DETAILED DESCRIPTION OF THE PREFERRED EMBODIMENTS

The present invention, in one of its aspects, comprises an insert or bushing for use in providing a seal at the junction of two axially aligned bores extending through the interface of two segments of solid material.

Figure 1:
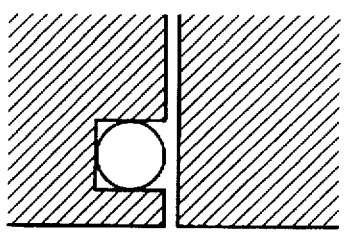
FIG. 1 is a cross-sectional view of the interface between two segments of solid material having a bore therethrough and sealed by the prior art method of inserting an O-ring into an annular groove having a rectangular cross-section (for the purpose of clarity, the mating faces are shown as being slightly separated one from the other)
Figure 1:
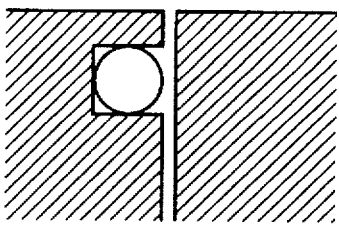
Figure 2:
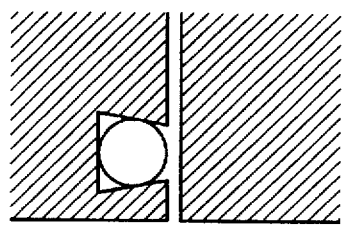
FIG. 2 is a cross-sectional view of the interface similar to the one in FIG. 1, showing a prior art dovetail groove being used to retain the O-ring.
Figure 2:
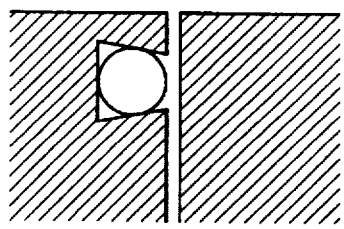
Figure 3:
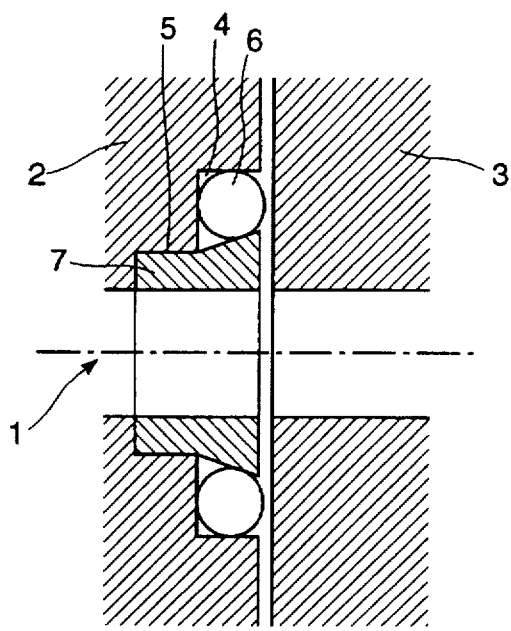
FIG. 3 is a cross-sectional view of the interface between two segments of solid material having a bore therethrough, sealed by an O-ring which is retained by an O-ring insert according to a preferred embodiment of the present invention.
Figure 4:
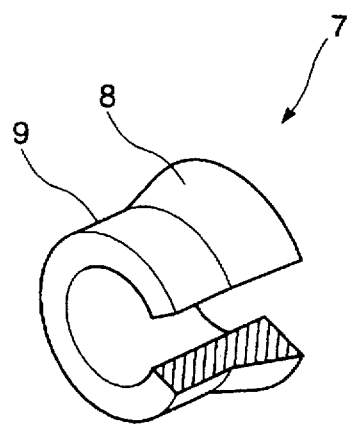
FIG. 4 is an axonometric view, partially in cross-section, of the O-ring insert of FIG. 3 according to the preferred embodiment of the present invention.

In a preferred embodiment illustrated in FIGS. 3 and 4, segments 2 and 3 represent plates of a mould used in the injection moulding industry. The mould is typically manufactured of steel, stainless steel or aluminum, although other materials can be used. A bore 1 extends through adjacent segments 2 and 3 of the modular mould.

The mating face of the segment 2 is provided, co-axially with the bore 1, with a first recess 4, extending inwardly from the mating face, and a second recess 5, extending inwardly from the bottom of the first recess 4. Both recesses 4 and 5 are preferably cylindrical, having substantially rectangular cross-sections. The recesses 4 and 5 can be bored in the segment 2 using a simple drilling operation. The second recess 5 has a diameter greater than the diameter of the bore 1 and the first recess 4 has a diameter greater than the diameter of the second recess 5.

FIG. 4 illustrates in more detail the O-ring insert in accordance with the preferred embodiment of the invention. The insert 7 is uniformly bored and comprises a shoulder or retaining portion 8 and a stem portion 9. In the preferred embodiment illustrated in FIG. 3, the inner diameter of the insert 7 is substantially equal to the diameter of the bore 1.

The shoulder or retaining portion 8 of the insert 7 has a length substantially equal to or less than the depth of the first recess 4, a substantially flat end face, and an outer surface of a substantially frusto-conical or obconic shape. The diameter of the retaining portion 8 at or near the end face is greater than the inner diameter of the O-ring 6, and the diameter of the retaining portion 8 adjacent the stem portion 9 is substantially equal to the outer diameter of the stem portion 9 and the diameter of the second recess 5. In this specification and claims appended thereto, the expression "frusto-conical"is intended to include frusto-conical and toroidal shapes, or a combination of frusto-conical and toroidal shapes, etc.

The stem portion 9 of the inert 7 preferably has a length substantially equal to or greater than the depth of the second recess 5 and an outer surface of a substantially cylindrical shape. The outer diameter of the stem portion 9 is substantially equal to or just slightly greater than the diameter of the second recess 5 such that the stem portion can be retained by a slight press fit against the generally rough walls of the bore 1. If desired, the stem can also be slightly tapered so as to allow for an easier initial insertion of the insert 7 into the second recess 5.

The insert 7 is manufactured of a substantially rigid material. The choice of material depends upon the properties of the fluid being delivered through the bore 1 and the temperature of the mould. In many instances, an inexpensive stable plastic material such as, for example, nylon 6, PVC, polypropylene, ABS, etc., will be used. If the fluid is aggressive, or if higher mould temperatures are required, the insert may be manufactured of polytetrafluoroethylene (Teflon®). Insert 7 will typically be installed in the second recess 5 manually and retained therein by frictional forces between the recess and insert surfaces Other methods of securing the insert 7 inside the second recess 5 may also be employed and include use of sealants and adhesives, threaded or bayonet-type engagement, etc. Such other methods are generally more complicated and expensive and will be used only if a particularly strong engagement is required.

It will be appreciated that in other embodiments, for example in engines or chemical reaction installations, the O-ring insert may also be manufactured of metal. Such metal may be the same as the metal used for the manufacture of the blocks or segments, or may comprise another compatible, readily machineable metallic material.

The O-ring 6 has an outer diameter substantially equal to the diameter of the first recess 4, an inner diameter equal to or greater than the diameter of the second recess 5, and a cross-sectional diameter greater than the depth of the first recess 4. The O-ring is typically manufactured of a resilient synthetic material such as neoprene, silicone rubber, polyethylene, etc. When the O-ring 6 is inserted into the annular groove defined by the walls of the first recess 4 and the outer surface of the retaining portion 8 of the insert 7, the O-ring will be retained in place regardless of the orientation of the segment 2.

In another aspect, the present invention provides a device for use in providing a seal at the junction of two axially aligned bores extending through the interface of two segments of solid material. The device comprises an O-ring in co-operation with an O-ring insert as described in greater detail above.

A further aspect, the present invention discloses a method of providing a seal at the junction of co-axial bores extending through two segments of solid material having generally flat mating faces. The method comprises drilling in one of the bores, at one of the mating faces, a first recess 4. The first recess 4 is co-axial with the bore 1 and has a diameter greater than the diameter of the bore 1. As the cross-section of the first recess 4 is of a simple, substantially rectangular shape, the drilling is performed in a single operation using conventional tools.

After the first recess 4 has been made, the second co-axial recess 5 is drilled. The second recess 5 extends from the bottom of the first recess 4 and has a diameter greater than the diameter of the bore 1 but smaller than the diameter of the first recess 4. The drilling is again performed in a single operation using conventional tools.

In the preferred embodiment, the method further comprises providing an O-ring 6 and an O-ring insert 7 as disclosed above, installing the insert 7 into the second recess 5, retainably inserting the O-ring 6 into the annular groove defined by the surfaces of the first recess 4 and the outer surface of the retaining portion 8 of the insert 7, and bringing the mating faces of segments 2 and 3 together.

In still another aspect, the present invention comprises a method of re-establishing a seal at the junction of co-axial bores extending through two segments of solid material having generally flat mating faces. As discussed above, the area of the mating face between the bore and the annular groove may be corroded, "washed away" or otherwise destroyed by the corrosive or abrasive action of the fluid being delivered through the bore. The deterioration process may be accelerated if the rough surface, variations in bore diameter and possible spacing between the mating faces result in the turbulent flow of the fluid.

Figure 5E:
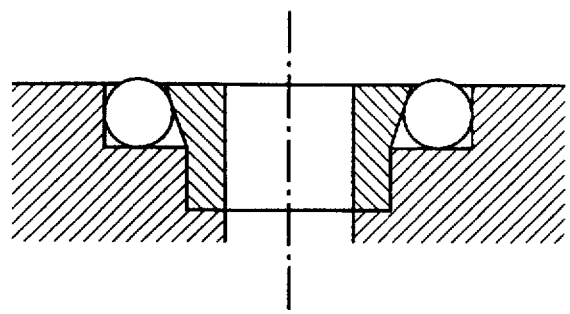
FIGS. 5a-5e are cross-sectional views illustrating a method of re-establishing a seal where the area of the grooved mating face between the bore and the annular groove has been destroyed due to a corrosive and/or abrasive action of fluid.
Figure 5D:
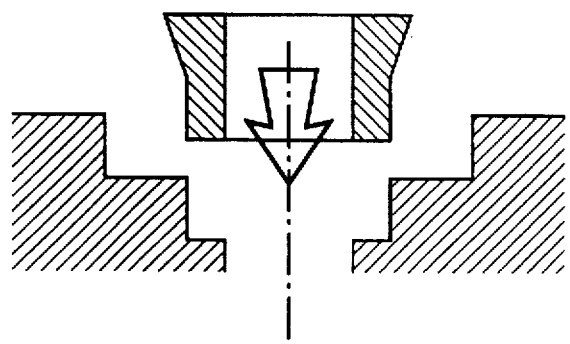
Figure 5C:
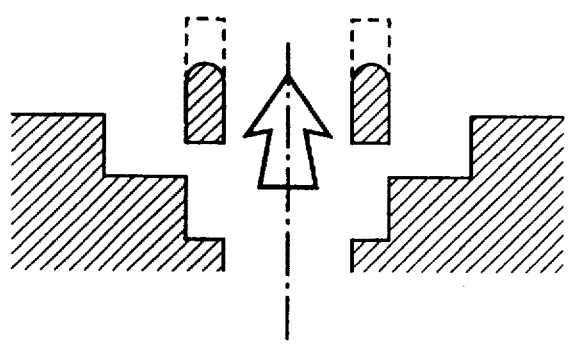
Figure 5B:
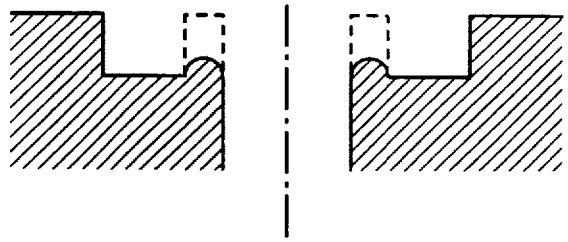
Figure 5A:
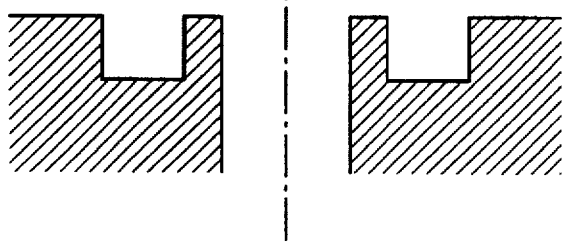

In the illustrations of FIGS. 5a–5e, the area between the bore and an original annular groove of a substantially rectangular cross-sectional shape (FIG. 5a) has been destroyed over time (FIG.5b). The preferred method of re-establishing a proper seal involves milling away the affected area and drilling, co-axially with the bore, a recess of a diameter equal to or greater than the inner diameter of the original annular groove (FIG. 5c).

The method further comprises providing an O-ring insert and an O-ring, both of which are described in detail above. The insert is thereafter installed in the recess (FIG. 5d), the O-ring is retainably inserted into the new annular groove defined by the remaining surfaces of the original annular groove and the retaining portion of the insert (FIG. 5e), and the mating faces are brought together.

This description is made with reference to the preferred embodiments of the invention. However, a person skilled in the art will be aware of numerous modifications and variations that can be made without departing from the spirit and scope of the present invention as defined in the appended claims. For example, although the mating face of the other segment (segment 3 in FIG. 3) is described as being generally flat, it may be provided with features which additionally limit and direct the displacement of the O-ring. Thus, particularly if higher pressures are involved, the area of the other surface opposite the annular groove may be provided with an annular ridge of appropriate dimensions.

What is claimed is:

1. A method for precluding leakage of fluid flowing through an original bore extending across the interface between two adjacent segments of solid materials in an injection moulding apparatus, each segment having a substantially flat mating face, comprising the steps of:
   (a) providing an O-ring;
   (b) providing a tubular insert having a stem portion and a shoulder portion, the shoulder portion having a substantially flat end face;
   (c) drilling into one of the mating faces a first enlarged bore concentrically about the original bore so as to form a first seat, the width of the first enlarged bore being such that the shoulder portion is snugly disposed therein and the depth of the enlarged bore being such that the shoulder end face can abut against the other mating face;
   (d) drilling into the same the mating face a second enlarged bore concentrically about the first enlarged bore so as to form a second seat, the depth of the second enlarged bore being sufficient to house the shoulder portion;
   (e) inserting the stem of the tubular insert into the first seat and retaining the O-ring in the second seat by press fit against the shoulder portion; and
   (f) bringing the mating faces together.

2. A method of providing a seal at the junction of axially aligned bores extending through two adjacent segments of solid material in an injection moulding apparatus, the segments having generally flat mating faces, comprising:
   drilling co-axially with the bore, at one of the mating faces, a first circular recess, the first recess having a substantially rectangular cross-section and a diameter greater than the diameter of the bore;
   drilling, co-axially with the first recess, a second circular recess of a diameter greater than the diameter of the bore and smaller than the diameter of the first recess, the second recess having a substantially rectangular cross-section and extending from the bottom of the first recess;
   providing a tubular insert manufactured of a substantially rigid material, comprising
      a retaining portion having a substantially flat end face and a length substantially equal to or smaller than the depth of the first recess, and a stem portion of a length substantially equal to or greater than the depth of the second recess, having an outer surface of a substantially cylindrical shape, the outer diameter of the stem portion being substantially equal to the diameter of the second recess;
   providing a resilient ring of a substantially circular cross-section having an outer diameter substantially equal to the diameter of the first recess, an inner diameter equal to or greater than the diameter of the second recess and a cross-sectional diameter greater than the depth of the first recess;
   inserting the stem portion into the second recess;
   retainably inserting the resilient ring into the annular groove defined by the surfaces of the first recess and the outer surface of the retaining portion; and
   bringing the mating faces together.

3. A method according to claim 2, wherein the inner diameter of the insert is substantially equal to the diameter of the bore.

4. A method according to claim 2, wherein the retaining portion has an outer surface of a substantially frusto-conical shape, the diameter at the end face being greater than the inner diameter of the resilient ring and the diameter adjacent the stem portion being substantially equal to the outer diameter of the stem portion.

5. A method according to claim 2, wherein the stem portion is retained in the second recess by the frictional forces between the surface of the second recess and the outer surface of the stem portion.

6. A method of re-establishing a seal at the junction of axially aligned bores extending through two adjacent segments of solid material in an injection moulding apparatus, the segments having generally flat mating faces, with one of the mating faces having been provided, co-axially with the bore, with an annular groove of a substantially rectangular cross-section for accommodating a sealing ring,
   wherein the area of the mating face between the bore and the inner surface of the annular groove has been destroyed over time due to a corrosive and/or abrasive action of the fluid flowing through the bores thereby causing a loss of the proper seal at the junction thereof,
   the method comprising:
      drilling, co-axially with the bore, a circular recess of a diameter equal to or greater than the inner diameter of the original annular groove and smaller than the outer diameter of the original annular groove, the recess having a substantially rectangular cross-section;
      providing a tubular insert manufactured of a substantially rigid material and comprising
         a retaining portion having a substantially flat end face and a length substantially equal to or smaller than the depth of the original annular groove, and a stem portion of a length substantially equal to or greater than the depth of the recess, having an outer surface of a substantially cylindrical shape, the outer diameter of the stem portion being substantially equal to the diameter of the recess;

providing a resilient ring of a substantially circular cross-section having an outer diameter substantially equal to the outer diameter of the original annular groove, an inner diameter equal to or greater than the diameter of the recess and a cross-sectional diameter greater than the depth of the original annular groove;

inserting the stem portion into the recess;

retainably inserting securing the resilient ring into a new annular groove, defined by the remaining surfaces of the original annular groove and the outer surface of the retaining portion; and bringing the mating faces together.

7. A method according to claim 6, wherein the inner diameter of the insert is substantially equal to the diameter of the bore.

8. A method according to claim 6, wherein the retaining portion has an outer surface of a substantially frusto-conical shape, the diameter at the end face being greater than the inner diameter of the resilient ring and the diameter adjacent the stem portion being substantially equal to the outer diameter of the stem portion.

9. A method according to claim 6, wherein the stem portion is retained in the recess by the frictional forces between the surface of the recess and the outer surface of the stem portion.

10. A method for precluding leakage of fluid flowing through an interface between two adjacent segments of solid materials, each segment having a mating face, comprising the steps of:

(a) providing an O-ring;

(b) providing a tubular insert having a stem portion and a shoulder portion, the shoulder portion having an end face;

(c) forming a through-bore which extends through portions of the segments of solid materials to span the interface thereof;

(d) forming in one of the mating faces a first enlarged bore concentrically about the through-bore so as to form a first seat, the width of the first enlarged bore being such that the stem portion can be snugly disposed therein and the depth of the enlarged bore being such that the shoulder end face can sealingly abut against the other mating face;

(e) forming, in the same mating face, a second enlarged bore concentrically about the first enlarged bore so as to form a second seat, the depth of the second enlarged bore being sufficient to house the shoulder portion;

(f) inserting the stem of the tubular insert into the first fit against the shoulder portion; and (g) bringing the mating faces together.

* * * * *